United States Patent [19]
Taguchi et al.

[11] 3,845,284
[45] Oct. 29, 1974

[54] POSITIONING APPARATUS

[75] Inventors: Nobuo Taguchi; Takehiko Ono, both of Tokyo, Japan

[73] Assignee: Tokyo Schibaura Electric Company, Ltd., Kanagawa-ken, Japan

[22] Filed: Mar. 15, 1973

[21] Appl. No.: 341,794

[30] Foreign Application Priority Data
Mar. 16, 1972  Japan.............................. 47-26111

[52] U.S. Cl. ......... 235/150.1, 214/1 CM, 318/567, 318/625
[51] Int. Cl............................................. B25j 1/02
[58] Field of Search............ 214/1 CM, 1 BC, 1 BD; 235/150.1

[56]  References Cited
UNITED STATES PATENTS
3,306,442  2/1967  Devol................................ 214/1 B
3,306,471  2/1967  Devol................................ 214/1 BC
3,543,947  12/1970  Devol................................ 214/1 BC
3,589,134  6/1971  Hackmann.................... 214/1 CM X
3,712,481  12/1971  Harwood........................ 214/1 CM

*Primary Examiner*—Eugene G. Botz
*Attorney, Agent, or Firm*—Oblon, Fisher, Spivak, McClelland & Maier

[57]  ABSTRACT

Positioning apparatus for coordinating the movement of two members of an industrial robot. The apparatus corrects the actual position of each member according to stored preset position instructions. The movement of each member is interrelated by means of a computer feedback loop that provides a feedback signal indicative of the difference in movement between the members. The feedback signal is then utilized by one of the members to correct its position when compared with its preset position instructions.

6 Claims, 8 Drawing Figures

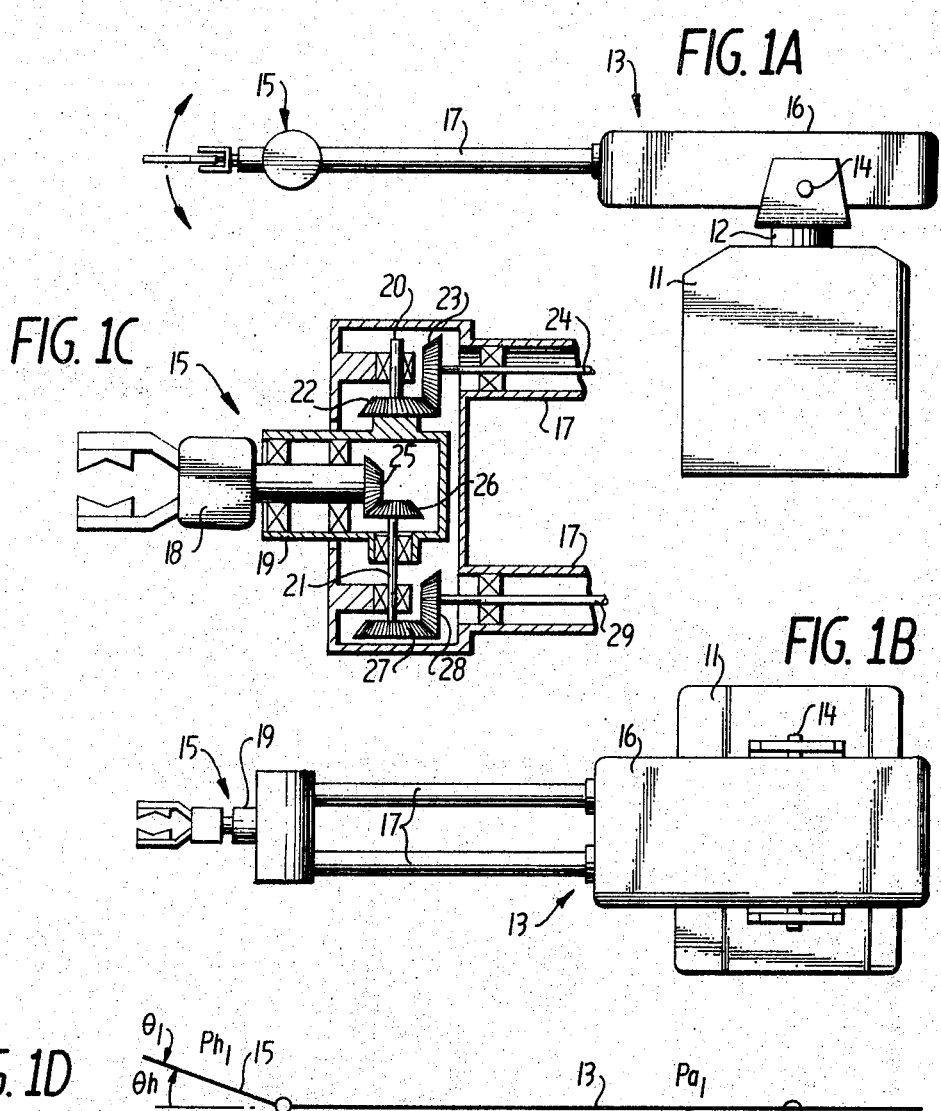
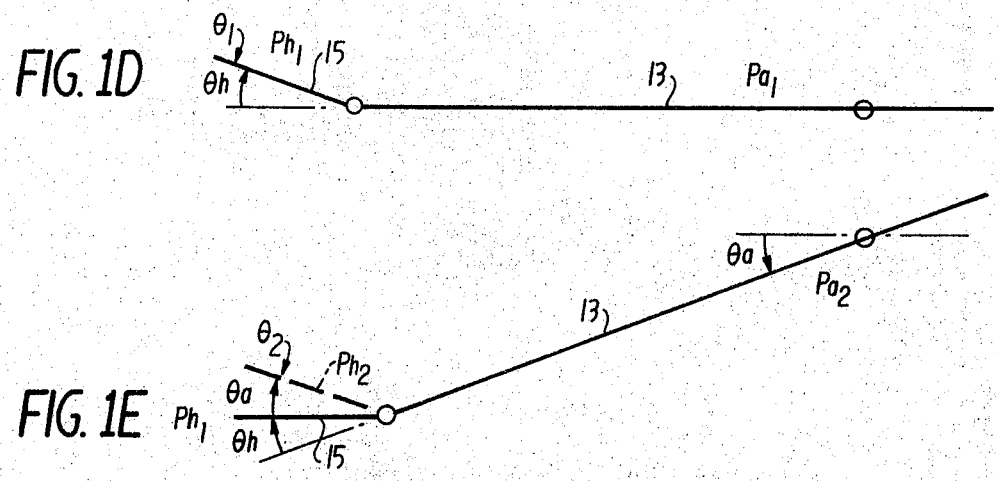

POSITIONING APPARATUS

BACKGROUND OF THE INVENTION

1. Field of the Invention

This invention relates generally to positioning apparatus and, more particularly, to an apparatus for controlling the position of at least two members of a machine commonly referred to as an industrial robot.

2. Description of the Prior Art

There have been developed various automated handling systems for use in industry such as, for example, a machine commonly referred to as an industrial robot. Common uses of such machines include the movement of a work piece from one position to another, or the performance of sequential spot welding of metallic members that have relatively complicated shapes.

A typical example of an industrial robot is illustrated in FIGS. 1A to 1C. Referring to FIGS. 1A and 1B showing side and plan views, respectively, the robot is seen to generally comprise a cabinet 11 which houses various working machines, a column 12 rotatably supported within cabinet 11 and projecting upwardly therefrom, an arm 13 supported on the top of column 12 so as to be rotatable about a shaft 14, and a hand portion 15 adapted to handle various objects and coupled to the outer end of the arm 13. The arm 13 generally comprises a stationary turret 16 which houses various working mechanisms, and a movable portion 17 supported by turret 16 so as to be retractable therein.

FIG. 1C illustrates the hand portion 15 of FIG. 1A in more detail which is seen to be comprised of a finger portion 18 which is rotatably supported within a gear case 19 by suitable bearings as shown. Gear case 19 is rotatably supported by shafts 20 and 21 aligned as shown. Shaft 20 is secured to gear case 19 and is rotatably supported with respect to movable portion 17 of arm 13 by suitable bearings. Shaft 21 is also rotatably supported with respect to portion 17 which in turn, rotatably supports gear case 19 by suitable bearings. The rotation of gear case 19 that results in the "bending" movement of hand 15 as depicted in FIG. 1A is actuated through a bevel gear 22 secured to case 19, a bevel gear 23 that meshes with gear 22, and a shaft 24 secured to gear 23. Rotation of the finger portion 18 (referred to hereinafter as the "swiveling" movement) is actuated through a bevel gear 25 which is affixed to finger portion 18, a bevel gear 26 that meshes with gear 25 and which is secured to shaft 21, a bevel gear 27 which is also secured to shaft 21, a bevel gear 28 that meshes with gear 27, and a shaft 29 that is secured to gear 28.

In the robot described hereinabove, there arises an undesirable swiveling of finger 18 when shaft 24 is actuated to rotate for the bending movement of hand 15. This occurs because shaft 29, bevel gears 28 and 27, shaft 21, as well as bevel gears 26 and 25, are all locked in rotation during the bending movement in which gear case 19 (including bevel gear 25) rotates about the axis defined by shafts 20 and 21.

A similar problem occurs during the rotation of arm 13 about shaft 14 (this rotation is referred to hereinafter as the "vertical" motion of arm 13).

FIGS. 1D and 1E are diagrammatic sketches showing the relationship between arm 13 and hand 15. In FIG. 1D, arm 13 and hand 15 are shown positioned at $Pa_1$ and $Ph_1$, respectively, with arm 13 being positioned horizontally and hand 15 bent upwardly by an angle $\theta h$. FIG. 1E illustrates the positioning of the members after a downward vertical motion through an angle $\theta a$ has been applied to arm 13. In this case, if $\theta a = \theta h$, hand 15 would rest horizontally as shown in FIG. 1E. However, frequently it is desired that hand portion 15 moves as shown in FIG. 1E by a dotted line during the vertical motion of arm 13, since in many cases vertical movement of arm 13 is done in order to cause parallel or corresponding movement of hand portion 15. Thus, it would be highly desirable to operate a robot capable of maintaining parallel movement of hand portion 15 during the vertical motion of arm 13.

To eliminate the above problems, a command device has been used which is designed to generate a command signal for cancelling any unnecessary motion. Also, a machine was developed to compensate for the unnecessary motion mechanically, such as disclosed in U.S. Pat. No. 3,784,031, filed Sept. 23, 1971 and entitled, "Machine For Performing Work", assigned to the same assignee of the instant invention. However, the former device has a drawback in that the command device is necessarily complicated, and in the latter device the movable portion of the mechanism is also quite complicated, and thus expensive to manufacture and difficult to maintain.

SUMMARY OF THE INVENTION

One object of the present invention is to provide an improved positioning apparatus adapted to position at least two members thereof without causing any undesirable motion of one member when the other member is positioned.

Briefly, in accordance with the invention, the above and other objects are achieved by providing a two member positioning apparatus wherein computing means are utilized for generating a feedback signal in response to the difference between two position signals, one generated for each of the two members. The two position signals are developed by detecting means that sense the movement of the members. The first member, which may, for example, comprise the arm of an industrial robot, is maintained in the desired position by comparing the detected position signal with a given command signal and generating an error or manipulation signal in response thereto. The second member, which may, for example, comprise the hand of an industrial robot, undergoes a two-fold position correction process in order to eliminate undesirable motion and coordinate its movement with that of the other member. First, the above-mentioned computing means is utilized to coordinate its actual position with the actual position of the other member. A feedback signal is generated that corresponds to the difference in detected positions. The feedback signal is then compared with the given command signal for the second member and an error or manipulation signal is generated in response thereto. The respective manipulation signals are fed to actuating means, one for each member, to bring about the desired movement.

BRIEF DESCRIPTION OF THE DRAWINGS

The present invention will become more fully apparent from the following detailed description of a preferred embodiment thereof with reference to the following drawing, in which:

FIG. 1A shows a side view of a typical industrial robot;

FIG. 1B shows a plan view of the industrial robot of FIG. 1A;

FIG. 1C shows a crosssectional plan view of the hand portion of the robot of FIGS. 1A and 1B;

FIGS. 1D and 1E show schematic diagrams helpful in understanding the mode of operation of the robot shown in FIGS. 1A to 1C;

BRIEF DESCRIPTION OF THE PREFERRED EMBODIMENTS

Figure 2:
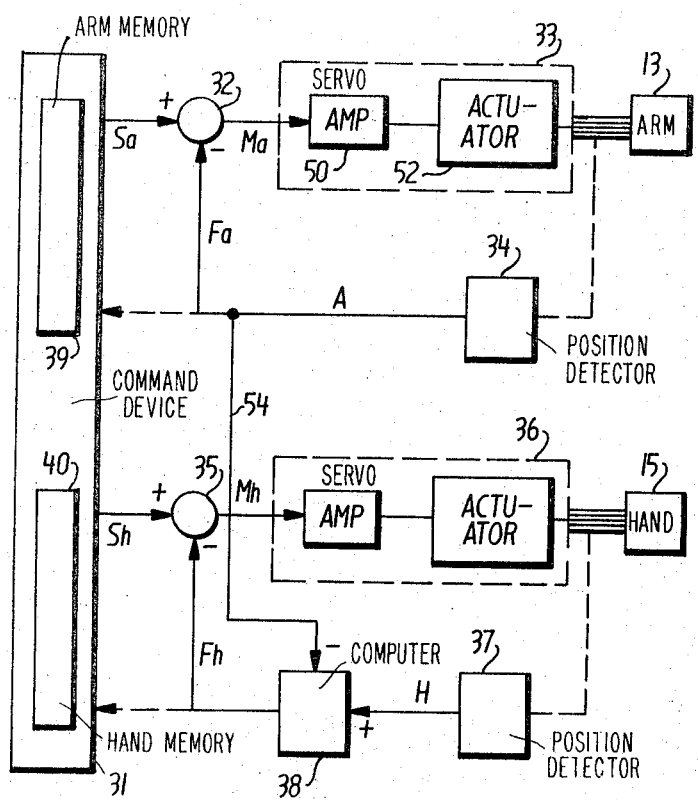
FIG. 2 shows a block diagram of a preferred embodiment of the present invention.
Figure 3:
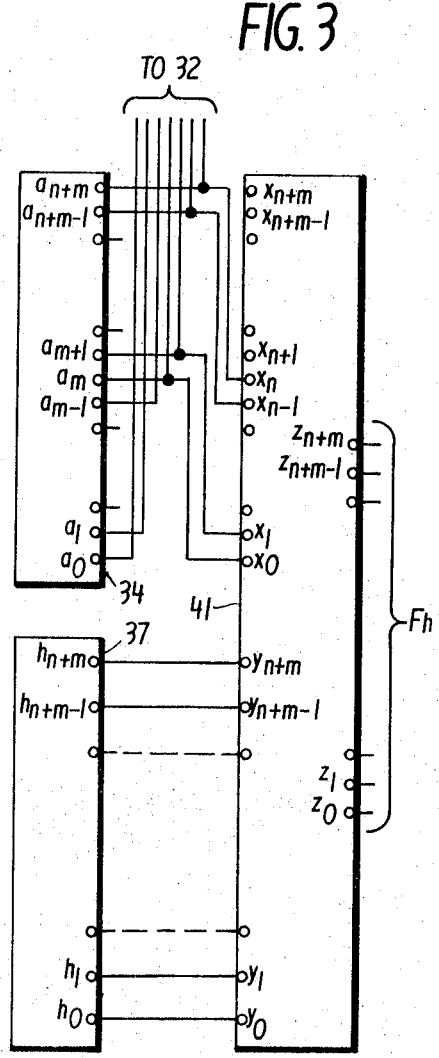
FIG. 3 shows a more detailed block diagram of a portion of the preferred embodiment of FIG. 2.

Referring now to the Drawings wherein like reference numerals refer to identical or corresponding parts throughout the several views and more particularly to FIGS. 2 and 3 thereof, wherein a preferred embodiment according to the present invention is illustrated in block diagram form. For better understanding and simplicity the following explanation of a preferred embodiment will be made in accordance with the robot as set forth hereinabove in the Description of the Prior Art. Thus, it is understood that the positioning apparatus controls the rotation of an arm 13 about a shaft 14 ("vertical" movement), and the rotation of a hand portion 15 about the axis defined by the shafts 20 and 21 ("bending" movement). Additionally, it should be noted that this invention can be used to compensate for other undesired motion such as, for example, that of the swiveling movement in finger portion 18 during the bending movement of hand 15.

Referring now to FIG. 2, numeral 31 indicates generally a command device for generating a pair of command signals Sa and Sh; Sa is utilized for vertical movement of the arm 13 and Sh is utilized for bending movement of the hand 15.

The command signal Sa is transmitted to a comparator 32 which also receives a feedback signal Fa and develops an error or manipulation signal Ma represented by $$Ma = Sa - Fa \quad (1)$$

The manipulation signal Ma is applied to an electrohydraulic servo-system 33, which comprises an amplifier 50 and an actuator 52 for actuating arm 13 in vertical movement in response to the signal Ma. There is also provided a rotational position detector, such as an encoder 34 which generates a position signal A representative of the rotational position of arm 13 about shaft 14, i.e., signal A represents the position of arm 13 during its vertical movement. The position signal A is fed back to comparator 32 as a feedback signal Fa. Thus, when arm 13 is actuated, it causes the feedback signal Fa = A to coincide with the command signal Sa, whereupon arm 13 is positioned in accordance with the given command signal Sa.

Similarly, command signal Sh, utilized for the bending movement of hand 15, is fed to a comparator 35 which develops an error or manipulation signal Mh represented by $$Mh = Sh - Fh, \quad (2)$$

wherein Fh is feedback signal to be described hereinafter. The manipulation signal Mh is transmitted to an electrohydraulic servo-system 36 for actuating the hand portion 15 in its bending movement, servo-system 36 being similar to servo-system 33 that actuates arm 13. The position of hand 15 with respect to arm 13 is detected by a position detector such as an encoder 37 which generates a position signal H. To compensate for the bending movement of hand 15 during the vertical movement of arm 13, a feedback loop 54 is provided which feeds position signal A to a computing means 38 which also receives position signal H from detector 37. Computing means 38 generates a feedback signal Fh represented by $$Fh = H - A/M \quad (3)$$

wherein M is a coefficient to be described hereinafter.

In this embodiment the command device 31 is constructed as a repetition type in a point-to-point positioning method. That is, the desired positions $Q_1, Q_2, Q_3, \ldots$ of the finger 18 that is to be sequentially positioned are fed into command device 31 manually (this step is called "teaching"). Thereafter, the sequential positioning $Q_1, Q_2, Q_3 \ldots$ is done automatically by reading out the memorized or stored positions in a prescribed sequence.

To this end the command device 31 comprises memory means 39 and 40 for arm 13 and hand 15 positioning, respectively. Teaching is accomplished by feeding the feedback signals Fa and Fh into the memory means 39 and 40 as represented by the dotted lines. Synchronized readout in a prescribed manner from memory means 39 and 40 generates the command signals Sa and Sh sequentially so that the point-to-point positioning in a predetermined sequence can be accomplished.

The coefficient M will now be explained. In general, the resolving power of the rotational position detector 34 for arm 13 is larger than that of the detector 37 for hand 15, inasmuch as the axial length between the free end and the rotating axis of arm 13 is larger than that of hand 15. M is thus defined as:

$$M = \frac{\text{Resolving Power of Detector 34}}{\text{Resolving Power of Detector 37}} \geq 1 \quad (4)$$

FIG. 3 shows a further detailed circuit diagram of the computer 38 represented by its logic circuit 41 and the detectors 34 and 37 of FIG. 2. The output signals A and H of the detectors 34 and 37 are represented by binary numbers, respectively, as follows:

$$A = a_0 \cdot 2^0 + a_1 \cdot 2^1 + a_2 \cdot 2^2 + a_3 \cdot 2^3 + a_4 \cdot 2^4 + \cdots + a_i \cdot 2^i \quad (5)$$

$$H = h_0 \cdot 2^0 + h_1 \cdot 2^1 + h_2 \cdot 2^2 + h_3 \cdot 2^3 + h_4 \cdot 2^4 + \cdots + h_j \cdot 2^j \quad (6)$$

The detectors 34 and 37 are arranged such that their output signals A and H, respectively, increase with a counter-clockwise and a clockwise rotation of arm 13 and hand 15, respectively. Accordingly, if the unit increment in the output signal A of detector 34 corresponds to an angle $q$, then the unit increment in output signal H of detector 37 corresponds to an angle $M \cdot q$. Thus the rotational positions Pa and Ph of arm 13 and hand 15 respectively, can be given by:

$$Pa = q \cdot A \tag{7}$$

$$Ph = M \cdot q \cdot H \tag{8}$$

Wherein M is further defined by $$M = 2^m \ (m = 0, 1, 2, 3, \dots) \tag{9}$$

Then the output signal A of detector 34 may be written as follows:

$$A = a_0 \cdot 2^0 + a_1 \cdot 2^1 + \cdots + a_i \cdot 2^i \tag{5}$$

$$= [a_0 \cdot 2^0 + a_1 \cdot 2^1 + \cdots + a_{m-1} \cdot 2^{m-1}] + 2^m \cdot [a_m \cdot 2^0 + a_{m+1} \cdot 2^1 + a_{m+2} \cdot 2^2 + \cdots + a_i \cdot 2^{i-m}] \tag{10}$$

$$\approx 2^m \cdot [a_m \cdot 2^0 + a_{m+1} \cdot 2^1 + a_{m+2} \cdot 2^2 + \cdots + a_i \cdot 2^{i-m}] \tag{11}$$

Accordingly, using equation (9), $$A/2^m = A/M = [a_m \cdot 2^0 + a_{m+1} \cdot 2^1 + a_{m+2} \cdot 2^2 + \cdots + a_i \cdot 2^{i-m}]. \tag{12}$$

We can assume, for brevity, that $$i = j = m + n \ (n \text{ is an integer}) \tag{13}$$

Referring now to FIG. 3, for the computer 38 there is provided a logic circuit 41 which provides an output Z from adding and subtracting inputs Y and X, respectively. The relationship between X, Y and Z is given by:

$$X = x_0 \cdot 2^0 + x_1 \cdot 2^1 + x_2 \cdot 2^2 + \cdots + x_{n+m} \cdot 2^{n+m} \tag{14}$$

$$Y = y_0 \cdot 2^0 + y_1 \cdot 2^1 + y_2 \cdot 2^2 + \cdots + y_{n+m} \cdot 2^{n+m} \tag{15}$$

$$Z = z_0 \cdot 2^0 + z_1 \cdot 2^1 + z_2 \cdot 2^2 + \cdots + z_{n+m} \cdot 2^{n+m} \tag{16}$$

$$Z = Y - X \tag{17}$$

The output of each digit $a_m, a_{m+1}, \cdots, a_{n+m}$ of the detector 34 is connected to each digit adding input $x_0, x_1, \cdots, x_{n+m}$ of the logic circuit 41 as shown. Also, the output of each digit $h_0, h_1, h_2, \cdots, h_{n+m}$ of the detector 37 is connected to each digit subtracting input $y_0, y_1, y_2, \cdots, y_{n+m}$ of the logic circuit 41 as shown.

Thus, since Y = H, by utilizing equations (6), (13) and (17), and expressing X of equation (14) in terms of the interconnections shown in FIG. 3, we find:

$$Z = Y - X$$
$$= [h_0 \cdot 2^0 + h_1 \cdot 2^1 + \cdots + h_{n+m} \cdot 2^{n+m}] - [a_m \cdot 2^0 + a_{m+1} \cdot 2^1 + \cdots + a_{n+m} \cdot 2^n] \tag{18}$$

Thus, using equations (12) and (13), $$Z = Y - X = H - A/M = H - A/2^m = F_h \tag{19}$$

The positioning operation of arm 13 from $Pa_1$ to $Pa_2$ and of hand 15 from $Ph_1$ to $Ph_2$ (see FIGS. 1D and 1E) will now be explained. After arm 13 and hand 15 are positioned at $Pa_1$ and $Ph_1$, respectively, teaching is accomplished as aforedescribed. Thus, in memory means 39 and 40 of command device 31 will be stored command signals $Sa_1$ and $Sh_1$, respectively, represented by $$Sa_1 = Fa_1 = A_1 \tag{20}$$

$$Sh_1 = Fh_1 = H_1 - A_1/M \tag{21}$$

Similarly, the teaching in connection with $Pa_2$ and $Ph_2$ is accomplished. Thus, $$Sa_2 = Fa_2 = A_2 \tag{22}$$

$$Sh_2 = Fh_2 = H_2 - A_2/M \tag{23}$$

Therefore, the angle of movement $\theta_a$ between positions $Pa_1$ and $Pa_2$ can be described utilizing equation (7) as:

$$\theta_a = Pa_2 - Pa_1 \tag{24}$$

$$= q \cdot (A_2 - A_1) \tag{25}$$

Accordingly, solving equation (25) for $A_2$ yields:

$$A_2 = \theta_a/q + A_1. \tag{26}$$

Similarly, if the same angle of movement $\theta_a$ is desired between positions $Ph_1$ and $Ph_2$:

$$\theta_a = Ph_2 - Ph_1 \tag{27}$$

$$= M \cdot q \cdot (H_2 - H_1). \tag{28}$$

Solving equation (28) for $H_2$ yields:

$$H_2 = \theta_a/M \cdot q + H_1 \tag{29}$$

Then $Sh_2$ of equation (23) may be rewritten by using equations (26), (29) and (21) as:

$$Sh_2 = H_2 - \frac{A_2}{M} \tag{30}$$

$$= \frac{\theta_a}{M \cdot q} + H_1 - \frac{\theta_a}{M \cdot q} - \frac{A_1}{M} \tag{31}$$

$$= H_1 - \frac{A_1}{M} \tag{32}$$

$$= Sh_1 \tag{33}$$

Therefore, it is seen that the command signal $Sh$ for hand 15 does not change during the parallel movement of hand 15.

When the command signal Sa generated from device 31 is changed from $Sa_1 = A_1$ to $Sa_2 = A_2$, the comparator 32 develops the manipulation signal Ma which corresponds to the error between the given command signal Sa and the feedback signal Fa. Thus when arm 13 is actuated to move towards the position $Pa_2$, this causes the detector 34 to change its output signal from $A_1$ towards $A_2$. This also corresponds to a change in the subtraction input signal X of logic circuit 41 shown in FIG. 3.

If arm 13 rotates towards position $Pa_2$ by the angle $q \cdot \Delta A$, i.e., the signal A increases by $\Delta A$ from $A_1$, the feedback signal Fh of the hand 15 decreases by $\Delta A/M$. Thus, using equation (19):

$$Fh = H_1 - A_1 + \Delta A/M = Fh_1 - \Delta A/M$$
(34)

Thus the manipulation or error signal Mh for hand 15 increases by $\Delta A/M$. Accordingly, hand 15 is actuated toward position $Ph_2$ from position $Ph_1$ by $\Delta A/M \cdot M \cdot q = \Delta A \cdot q$
(35)

In this manner, hand 15 is actuated to bend in response to the rotational movement of arm 13. Thus, parallel movement of hand 15 is assured.

It should be noted that in the prior art method aforedescribed, wherein compensation was accomplished by changing the command signal for the hand, it was necessary to control the speed of the bending movement in order to perform the parallel movement of hand 15. According to this invention, however, the parallel movement can be accomplished without positive control of the speed in the hand operation, since the hand is actuated in direct response to the real arm motion.

Figure 4:
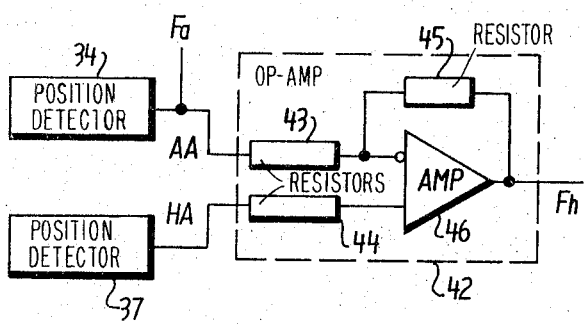
FIG. 4 shows a block diagram of a portion of another embodiment of the present invention.

Referring now to FIG. 4, another embodiment of this invention is illustrated which employs an analog servosystem. In the analog system, analog-type detectors 34 and 37 are utilized which generate analog signals AA and HA, respectively, that correspond to the rotational positions of arm 13 and hand 15, respectively.

In this embodiment, an operational amplifier 42 is substituted for the computer 38 of FIG. 2. The operational amplifier 42 comprises input resistors 43 and 44, a feedback resistor 45, and a high gain amplifier 46.

As is well known by those skilled in the art, if input resistors 43 and 44 are selected as follows Value of Resistor 43/Value of Resistor 44 = $M$, then
(36)
we find the ouput of amplifier 42 to be: $Fh = HA - AA/M$
(37)
Thus the operation is similar to the digital device described above.

The feature of the analog embodiment is that the ratio M between the resolving powers of detectors 34 and 37 may be selected more easily than the digital servo type.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by LETTERS patent of the United States is:

1. A positioning apparatus for positioning at least first and second members in response to given command signals therefor, which comprises:
   first and second actuating means for positioning said two members in response to first and second manipulation signals, respectively;
   first and second detecting means for generating first and second position signals proportional to the movement of said first and second members, respectively;
   first comparing means for comparing said first position signal with said given command signal for said first member and for generating said first manipulation signal in response thereto;
   computing means for receiving said first and second position signals and for generating a feedback signal in response thereto; and
   second comparing means for comparing said feedback signal with said given command signal for said second member and for generating said second manipulation signal in response thereto.

2. The positioning apparatus as set forth in claim 1 wherein said first comparing means comprises means for subtracting said first position signal from said first command signal whereby said first manipulation signal corresponds to the difference therebetween.

3. The positioning apparatus as set forth in claim 1 wherein said second comparing means comprises means for subtracting said feedback signal from said second position signal whereby said second manipulation signal corresponds to the difference therebetween.

4. The positioning apparatus as set forth in claim 1 wherein said computing means comprises means for subtracting said first position signal from said second position signal whereby said feedback signal corresponds to the difference therebetween.

5. The positioning apparatus as set forth in claim 4 wherein said computing means comprises a digital logic circuit.

6. The positioning apparatus as set forth in claim 4 wherein said computing means comprises an analog circuit.

* * * * *